United States Patent
Shor et al.

(10) Patent No.: US 9,589,177 B2
(45) Date of Patent: *Mar. 7, 2017

(54) ENHANCED FACE DETECTION USING DEPTH INFORMATION

(71) Applicant: APPLE INC., Cupertino, CA (US)

(72) Inventors: Yael Shor, Tel Aviv (IL); Tomer Yanir, Rinnatya (IL); Yaniv Shaked, Binyamina (IL)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,868

(22) Filed: Mar. 22, 2015

(65) Prior Publication Data

US 2015/0193649 A1    Jul. 9, 2015

Related U.S. Application Data

(63) Continuation of application No. 13/751,173, filed on Jan. 28, 2013, now Pat. No. 8,989,455.

(60) Provisional application No. 61/595,092, filed on Feb. 5, 2012.

(51) Int. Cl.
*G06K 9/00* (2006.01)
*G06T 7/00* (2006.01)

(52) U.S. Cl.
CPC ..... *G06K 9/00241* (2013.01); *G06K 9/00201* (2013.01); *G06K 9/00221* (2013.01); *G06T 7/0081* (2013.01); *G06T 2207/10004* (2013.01); *G06T 2207/30201* (2013.01)

(58) Field of Classification Search
CPC ........... G06K 9/00241; G06K 9/00201; G06K 9/00221; G06K 9/00228; G06K 9/00288; G06K 9/00281; G06K 9/00248; G06T 7/0081; G06T 2207/10004; G06T 2207/30201
USPC ...... 382/118, 115; 324/129, 127, 117 R, 687
See application file for complete search history.

(56) References Cited

U.S. PATENT DOCUMENTS

| | | | | |
|---|---|---|---|---|
| 6,188,777 B1* | 2/2001 | Darrell | | G06K 9/00362 348/169 |
| 7,372,977 B2* | 5/2008 | Fujimura | | G06K 9/00369 382/103 |
| 7,835,568 B2* | 11/2010 | Park | | G06T 17/10 382/154 |
| 8,786,760 B2* | 7/2014 | Yu | | G03B 13/36 348/345 |
| 9,256,835 B2* | 2/2016 | Ito | | G06K 9/00248 |
| 2012/0069007 A1* | 3/2012 | Pegg | | G06K 9/00221 345/419 |

* cited by examiner

*Primary Examiner* — Sheela C Chawan
(74) *Attorney, Agent, or Firm* — D.Kligler IP Services Ltd.

(57) ABSTRACT

A method for face detection includes capturing a depth map and an image of a scene and selecting one or more locations in the image to test for presence of human faces. At each selected location, a respective face detection window is defined, having a size that is scaled according to a depth coordinate of the location that is indicated by the depth map. Apart of the image that is contained within each face detection window is processed to determine whether the face detection window contains a human face. Similar methods may also be applied in identifying other object types.

20 Claims, 3 Drawing Sheets

ENHANCED FACE DETECTION USING DEPTH INFORMATION

CROSS-REFERENCE TO RELATED APPLICATION

This application is a continuation of U.S. patent application Ser. No. 13/751,173, filed Jan. 28, 2013, which claims the benefit of U.S. Provisional Patent Application 61/595,092, filed Feb. 5, 2012, which is incorporated herein by reference.

FIELD OF THE INVENTION

The present invention relates generally to image processing, and particularly to detection of faces in images.

BACKGROUND

Many methods of automatic face recognition are known in the art. In such methods, a computer extracts and processes facial features from a captured image to identify the person or people in the image, typically by comparison to a facial database.

A necessary precursor to face recognition in many application environments is face detection: processing a captured image to determine whether there are any faces in the image and, if so, determining the location and extent of each face. Face detection is also useful in other applications, such as content-based image retrieval, video coding video conferencing, crowd surveillance, and intelligent human-computer interfaces. The human face is a dynamic object, however, and has a high degree of variability in its appearance, which makes face detection a difficult problem in computer vision.

A variety of approaches to the problem of face detection are known in the art and are surveyed in the above-mentioned provisional patent application. Representative algorithms are described in the following publications, which are incorporated herein by reference:
1) M.-H. Yang, et al., "Detecting Faces in Images: A Survey," *IEEE Transactions on Pattern Analysis and Machine Intelligence* 24(1), pages 34-58 (2002).
2) Paul Viola and Michael J Jones, "Robust Real-Time Face Detection," *International Journal of Computer Vision* 57, pages 137-154 (2004).
3) Oliver Jesorsky, et al., "Robust Face Detection Using the Hausdorff Distance," *Third International Conference on Audio—and Video-based Biometric Person Authentication*, pages 90-95 (Springer, Lecture Notes in Computer Science, LNCS-2091, Halmstad, Sweden, 6-8 Jun. 2001).
4) H. Rowley, et al., "Neural Network-Based Face Detection," *IEEE Transactions on Pattern Analysis and Machine Intelligence* 20(1), pages 23-38 (1998).
5) Zhang, C., and Zhang, Z., "A survey of recent advances in face detection," Technical Report, Microsoft Research (2010).

SUMMARY

Embodiments of the present invention provide improved methods, apparatus and software for detection of particular types of features in an image, which are applicable particular to detection of faces.

There is therefore provided, in accordance with an embodiment of the present invention, a method for face detection, which includes capturing a depth map and an image of a scene. One or more locations in the image are selected to test for presence of human faces. At each selected location, a respective face detection window is defined, having a size that is scaled according to a depth coordinate of the location that is indicated by the depth map. A part of the image that is contained within each face detection window is processed to determine whether the face detection window contains a human face.

Typically, defining the respective face detection window includes setting the size of the face detection window according to an extent, in pixels of the image, of a standard face at the depth indicated by the depth map.

In some embodiments, processing the part of the image includes normalizing the part of the image within each face detection window to a predetermined size, and applying a face detection algorithm to the normalized part of the image. Applying the face detection algorithm may include comparing the normalized part of the image within each face detection window to a single template, which is used to test for the presence of human faces at all of the selected locations.

There is also provided, in accordance with an embodiment of the present invention, apparatus for face detection, including an imaging assembly, which is configured to capture a depth map and an image of a scene. A processor is configured to select one or more locations in the image to test for presence of human faces, to define, at each selected location, a respective face detection window having a size that is scaled according to a depth coordinate of the location that is indicated by the depth map, and to process a part of the image that is contained within each face detection window to determine whether the face detection window contains a human face.

There is additionally provided, in accordance with an embodiment of the present invention, a computer software product, including a non-transitory computer-readable medium in which program instructions are stored, which instructions, when read by a computer, cause the computer to receive a depth map and an image of a scene, to select one or more locations in the image to test for presence of human faces, to define, at each selected location, a respective face detection window having a size that is scaled according to a depth coordinate of the location that is indicated by the depth map, and to process a part of the image that is contained within each face detection window to determine whether the face detection window contains a human face.

There is further provided, in accordance with an embodiment of the present invention, a method for image processing, which includes capturing a depth map and an image of a scene. A base window size is set, based on a characteristic size of a given object type that is to be identified in the scene. One or more locations in the image are selected to test for presence of objects of the given type. At each selected location, a respective detection window is selected, having a size that is scaled, relative to the base window size, according to a depth coordinate of the location that is indicated by the depth map. A part of the image that is contained within each detection window is processed to determine whether the detection window contains an object of the given type.

In some embodiments, processing the part of the image includes detecting a selected part of a human body, and the base window size is set according to the characteristic size of the selected part.

There is moreover provided, in accordance with an embodiment of the present invention, apparatus for image processing, including an imaging assembly, which is configured to capture a depth map and an image of a scene. A processor is configured to set a base window size based on a characteristic size of a given object type that is to be identified in the scene, to select one or more locations in the image to test for presence of objects of the given type, to define, at each selected location, a respective detection window having a size that is scaled, relative to the base window size, according to a depth coordinate of the location that is indicated by the depth map, and to process a part of the image that is contained within each detection window to determine whether the detection window contains an object of the given type.

There is furthermore provided, in accordance with an embodiment of the present invention, a computer software product, including a non-transitory computer-readable medium in which program instructions are stored, which instructions, when read by a computer, cause the computer to receive a depth map and an image of a scene, to set a base window size based on a characteristic size of a given object type that is to be identified in the scene, to select one or more locations in the image to test for presence of objects of the given type, to define, at each selected location, a respective detection window having a size that is scaled, relative to the base window size, according to a depth coordinate of the location that is indicated by the depth map, and to process a part of the image that is contained within each detection window to determine whether the detection window contains an object of the given type.

The present invention will be more fully understood from the following detailed description of the embodiments thereof, taken together with the drawings in which:

DETAILED DESCRIPTION OF EMBODIMENTS

Figure 1:
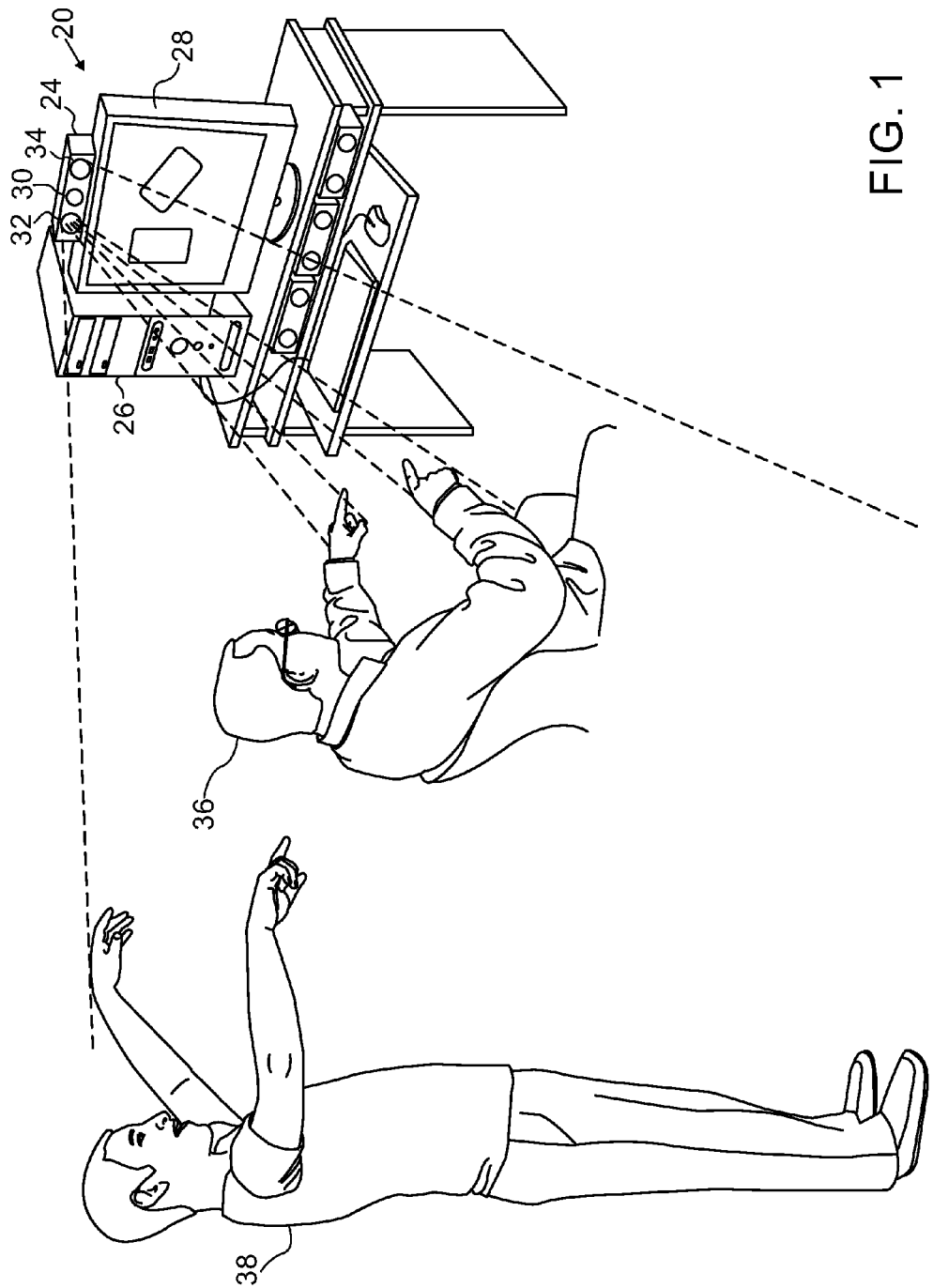
FIG. 1 is a schematic, pictorial illustration of a system for depth mapping and image processing, in accordance with an embodiment of the present invention.

Face detection algorithms generally test the part of an image within a given window to determine whether it contains a face. When face detection is to be applied to a dynamic scene, in which people may be found at any location, many windows must generally be tested in this way, at all candidate locations where a face may be found. Furthermore, when people in the scene may be located at different depths (distances from the camera), the sizes of the areas in the image occupied by their faces will vary greatly. Therefore, to detect faces over the full range of possible depths, the face detection algorithm must generally test multiple windows of different sizes at each candidate location (possibly even a set of such windows centered on every single pixel in the image). The need to test so many windows consumes computing power and increases the false detection rate of the algorithm. On the other hand, reducing the number of windows that are tested can result in failure to detect faces at some locations or depths.

Embodiments of the present invention that are described herein address this problem by using depth information in choosing the appropriate window size at each candidate location. The depth information derived from a depth map of the scene whose image is to be analyzed for purposes of depth detection. Such a depth map may be captured by any means that are known in the art. At each location that is to be tested for presence of a human face, an image processor defines a face detection window whose size is scaled according to the depth coordinate of that location, as indicated by the depth map. Typically, this size is set according to the extent, in pixels of the image, of a standard face at the depth indicated by the depth map.

The image processor applies a face detection algorithm to the part of the image that is contained within each face detection window, in order to determine whether the window contains a human face. Any suitable face detection algorithm that is known in the art may be used at this stage. Because the depth at each location is known, however, it is generally necessary to test only a single window, of the appropriate, known size, at each image location. Therefore, regardless of the algorithm that is used, the required computing power and the false detection rate are reduced. The rate of correct detection of faces may also be increased (or equivalently, the number of missed faces decreased), since a window of the precisely correct size will be used at nearly all locations.

The embodiments described below illustrate a face detection application using a particular type of depth mapping system, based on projection and detection of patterned light. This particular system is shown solely by way of example, however, and the principles of the present invention may similarly be applied using substantially any means of depth detection that are known in the art, such as time-of-flight detection or stereoscopic image analysis.

Furthermore, although the embodiments described herein relate specifically to face detection, the principles of the present invention may also be applied, mutatis mutandis, in image analysis to detect other types of objects having predefined geometrical characteristics. For example, the methods described herein may be applied in detecting the locations of the hands in an image of a user of a gesture-controlled computerized system, so that the posture and motions of the hand can be recognized quickly and reliably. As another example, these methods may be used in a vehicle-mounted system for automatic detection and reading of traffic signs. In each of these applications, as well as in other applications that will be apparent to those skilled in the art, depth measurements are used to choose an appropriate window size for detection of a predefined object type at each candidate point in an image. For this purpose, in both face detection and other object detection tasks, a base window size is determined by the characteristic size of the type of object that is to be detected, and this base size is scaled according to the depth measurements.

FIG. 1 is a schematic, pictorial illustration of a system 20 for 3D mapping and imaging, in accordance with an embodiment of the present invention. In this example, an imaging assembly 24 is configured to capture and process 3D maps and images of a scene, which in this case contains human subjects 36 and 38. An imaging assembly of this sort is described, for example, in U.S. Patent Application Publication 2010/0007717, whose disclosure is incorporated herein by reference.

In the example shown in FIG. 1, a projector 30 in imaging assembly 24 projects a pattern of optical radiation onto the scene, and a depth camera 32 captures an image of the pattern that appears on the scene (including subjects 36 and 38). The optical radiation that is used for this purpose is typically in the infrared (IR) range. A processing device in assembly 24 processes the image of the pattern in order to generate a depth map of the body, i.e., an array of 3D coordinates, comprising a depth (Z) coordinate value of the objects in the scene at each point (X,Y) within a predefined area. (In the context of an array of image-related data, these (X,Y) points are also referred to as pixels.)

In addition, a color camera 34 in imaging assembly captures color (2D) images of the scene. (Alternatively, although the present embodiment relates to color images, camera 34 may capture other sorts of 2D images, such as gray-scale images based on visible and/or infrared light, and these alternative sorts of 2D images may likewise be processed for purposes of face identification in the manner described hereinbelow.) The imaging assembly registers and synchronizes the depth maps with the color images, and generates a data stream that includes the depth maps and image data for output to an image processor, such as a computer 26. Although computer 26 is shown in FIG. 1 as a separate unit from imaging assembly 24, the functions of these two components may alternatively be combined in a single physical unit, and the depth mapping and image processing functions of system 20 may even be carried out by a single processor.

Computer 26 processes the data generated by assembly in order to detect faces in the images captured by camera 34. For this purpose, the computer defines windows at candidate locations in each image, wherein the window sizes are determined by the depth information provided by depth camera 32, as described in greater detail hereinbelow. The computer applies a face detection algorithm to each such window in order to determine whether the window contains a human face. If so, the computer may optionally apply a face recognition algorithm to identify the person to whom the face belongs. Typically, computer 26 comprises a general-purpose computer processor, which is programmed in software to carry out the above functions. The software may be downloaded to the processor in electronic form, over a network, for example, or it may alternatively be provided on tangible, non-transitory media, such as optical, magnetic, or electronic memory media. Further alternatively or additionally, at least some of the functions of computer 26 may be carried out by hard-wired or programmable logic components.

Figure 2:
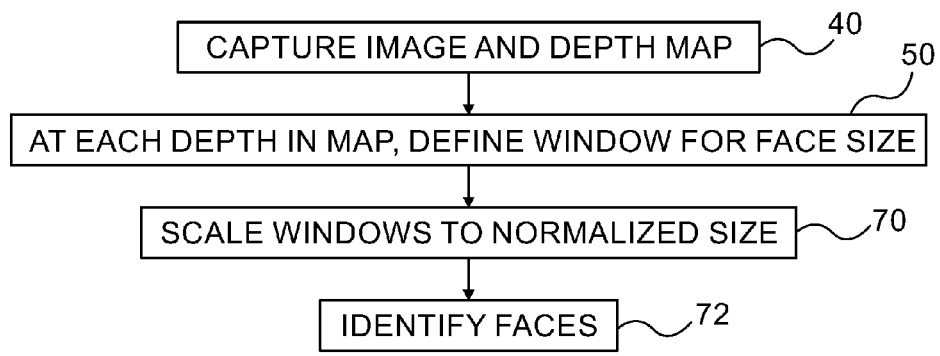
FIG. 2 is a flow chart that schematically illustrates a method for face detection, in accordance with an embodiment of the present invention.
Figure 3:
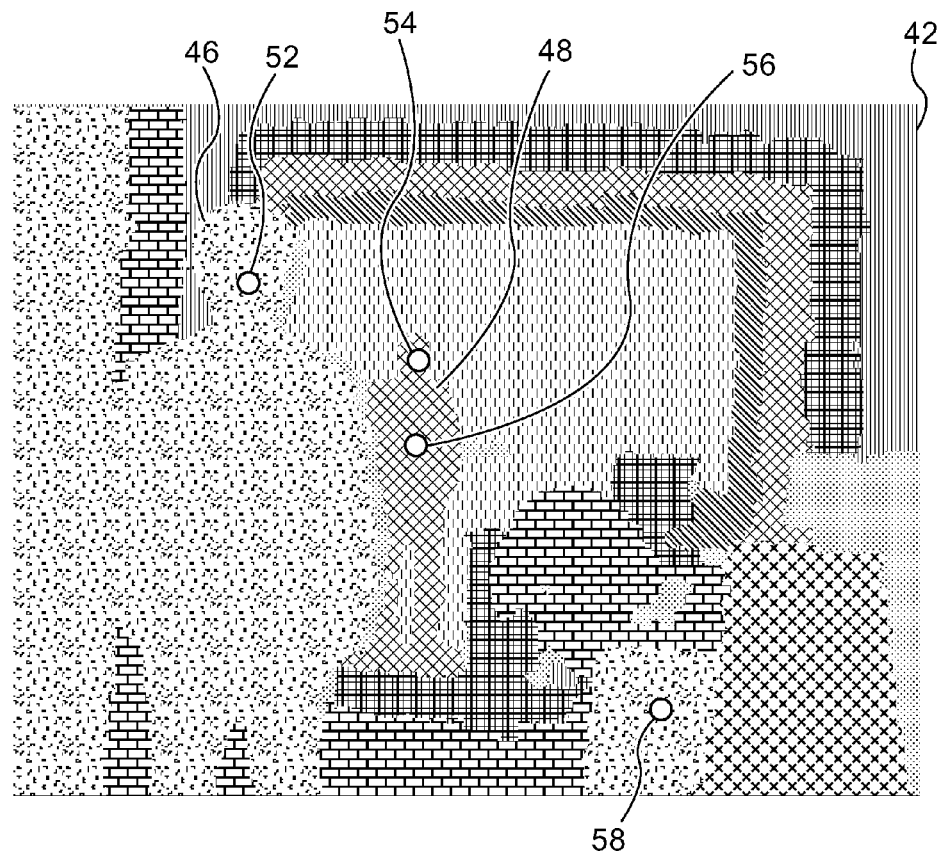
FIG. 3 is a schematic representation of a depth map, in accordance with an embodiment of the present invention.
Figure 4:
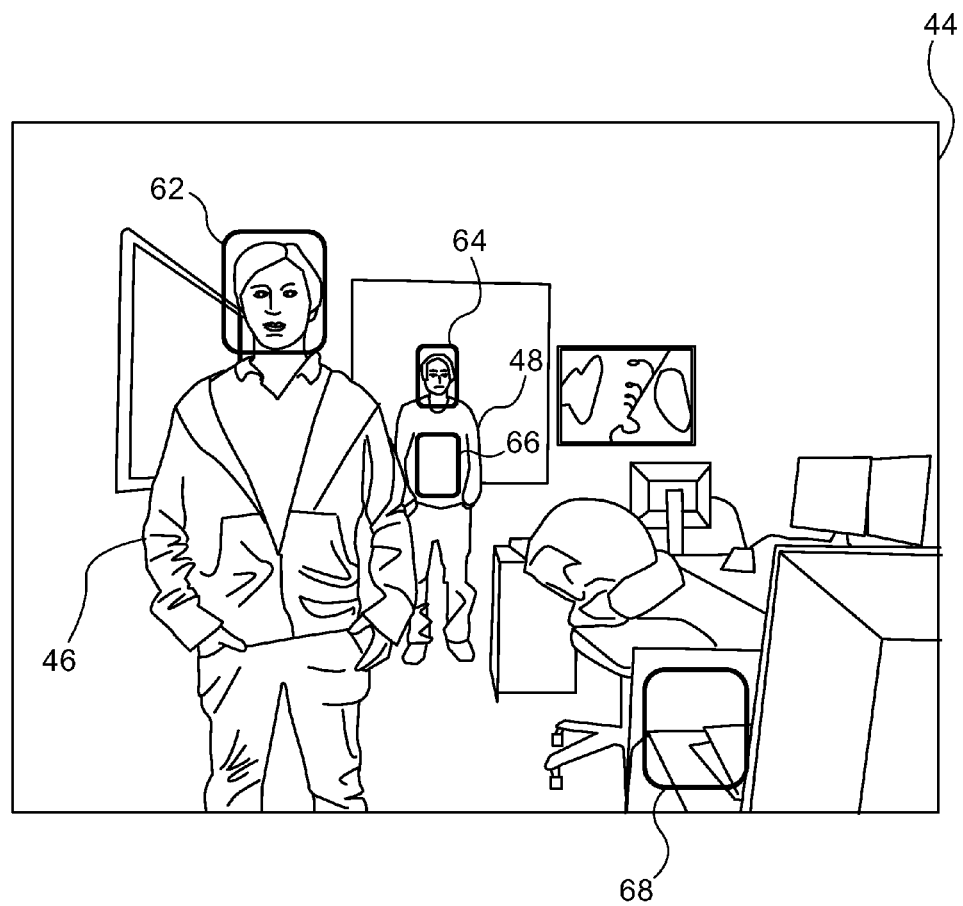
FIG. 4 is a schematic representation of an image showing image windows used in face detection, in accordance with an embodiment of the present invention.

Reference is now made to FIGS. 2, 3 and 4, which schematically illustrates a method for face detection, in accordance with an embodiment of the present invention. FIG. 2 is a flow chart showing steps in the method. FIG. 3 is a schematic representation of a depth map 42 of a scene that is used, by way of example, in this context, while FIG. 4 is a schematic representation of an image 44 of the same scene. In FIG. 3, different depth values are represented by different styles of hatching. The method of FIG. 2 is described, for the sake of convenience and clarity, with reference to the elements of system 20 (FIG. 1) and the example depth map and image that are shown in FIGS. 3 and 4, but the method may similarly be applied to other sorts of images and corresponding depth maps.

The process of face detection begins with capture an image of a scene, such as image 44, and a depth map of the same scene, such as depth map 42, at a capture step 40. In a system such as that described in the above-mentioned U.S. Patent Application Publication 2010/0007717, the images and maps output by assembly 24 are mutually registered. Otherwise, computer 26 may register the image and the map with one another based, for example, on image features and/or geometrical considerations. Map 42 and image 44 in this example contain two people 46, 48, at distinctly different depths.

Computer 26 defines windows appropriate to a standard face size for each of the multiple depth values that appear in map 42, at a window definition step 50. The "standard" face size is typically equal to or slightly larger than the width of an average face, i.e., around 22 cm. The corresponding window size (in pixels) at each depth may be computed a priori from trigonometric principles if the angular field of view and the resolution of camera 34 are known. Alternatively, a reference image that is known to contain a face at a known depth may be used to calibrate the standard face size. Thus, for example, if a face at a distance of 3.5 m from imaging assembly 24 occupies 50×70 pixels, then the window size at any other distance can be found simply by linear scaling relative to the distance.

On this basis, computer 26 selects windows to test for presence of a face at multiple candidate locations, such as locations 52, 54, 56, 58 in FIG. 3. These locations may be chosen as candidates for analysis on the basis of particular image features, or alternatively, the entire map 42 and image 44 may be covered by a grid of locations, possibly to the extent of evaluating a window centered on every pixel in image 44. At each of these locations, computer 26 defines a respective window 62, 64, 66, 68. As can be seen in FIG. 4, all of these windows have the same shape, but different sizes depending on the corresponding depths of locations 52, 54, 56, 58 in map 42.

Computer 26 extracts the image content from each window 62, 64, 66, 68, and prepares the window images for processing, at a normalization step 70. Typically, the windows contents are normalized, by scaling all windows to a predetermined size, such as 30×40 pixels. In this case, the same face detection algorithm parameters, such as a single matching template, can be applied to each window, regardless of the original window size. Alternatively, the algorithm parameters may be scaled to fit the size of each window. The computer then detects any faces that may be contained in the windows, at a face detection step 72. The output of this step is typically a binary yes/no: Does the window contain a face or does it not. Thereafter, computer 26 may apply an additional step of identifying any faces that have been found, but this step is beyond the scope of the present patent application.

Any suitable algorithm that is known in the art may be applied to detect faces at step 72. For example, as noted earlier, computer 26 may compute a correlation between the image in each window and a matching template, and may signal that a given window contains a face when the correlation is above a predefined threshold. Alternatively or additionally, the algorithms described in the references cited in the Background section may be used, mutatis mutandis. Most of these algorithms operate on the image at multiple different scales, over windows of different sizes, since the expected face size at any given location in the processed image is not known in advance. When applied at step 72 in the present method, however, the algorithms are adapted so as to test only a single, appropriate window size at each location, based on the depth found at step 50.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for face detection, comprising:
    capturing, using a depth sensor, a depth map of a scene, the depth map comprising an array of three-dimensional coordinates;
    capturing, using a camera, a two-dimensional image of the scene;
    selecting, by a computer, one or more locations in the two-dimensional image to test for presence of human faces;
    at each selected location, defining by the computer a respective face detection window having a size that is scaled according to an expected face size, in pixels of the image, at a depth, of the location, that is indicated by the depth map; and
    processing, using the computer, a part of the two-dimensional image that is contained within each face detection window to determine whether the face detection window contains a human face.

2. The method according to claim 1, wherein defining the respective face detection window comprises setting the size of the face detection window according to an extent, in pixels of the image, of an average face at the depth indicated by the depth map.

3. The method according to claim 1, wherein processing the part of the image comprises normalizing the part of the image within each face detection window to a predetermined size, and applying a face detection algorithm to the normalized part of the image.

4. The method according to claim 3, wherein applying the face detection algorithm comprises comparing the normalized part of the image within each face detection window to a single template, which is used to test for the presence of human faces at all of the selected locations.

5. The method according to claim 1, further comprising calibrating the expected face size, using a reference image that is known to contain a face at a known depth.

6. The method according to claim 5, wherein calibrating the expected face size comprises calibrating the expected face size by linearly scaling a size of the face in the reference image.

7. The method according to claim 1, wherein, at each selected location, the face detection window having the size that is scaled according to the expected face size is the only face detection window defined by the computer.

8. Apparatus for face detection, comprising:
    a depth sensor, which is configured to capture a depth map of a scene, the depth map comprising an array of three-dimensional coordinates;
    a camera, which is configured to capture a two-dimensional image of the scene; and
    a processor, which is configured to select one or more locations in the two-dimensional image to test for presence of human faces, to define, at each selected location, a respective face detection window having a size that is scaled according to an expected face size, in pixels of the image, at a depth, of the location, that is indicated by the depth map, and to process a part of the two-dimensional image that is contained within each face detection window to determine whether the face detection window contains a human face.

9. The apparatus according to claim 8, wherein the size of the face detection window is set according to an extent, in pixels of the image, of an average face at the depth indicated by the depth map.

10. The apparatus according to claim 8, wherein the processor is configured to normalize the part of the image within each face detection window to a predetermined size, and to apply a face detection algorithm to the normalized part of the image.

11. The apparatus according to claim 10, wherein the face detection algorithm comprises comparing the normalized part of the image within each face detection window to a single template, which is used to test for the presence of human faces at all of the selected locations.

12. The apparatus according to claim 8, wherein the processor is further configured to calibrate the expected face size, using a reference image that is known to contain a face at a known depth.

13. The apparatus according to claim 12, wherein the processor is configured to calibrate the expected face size by linearly scaling a size of the face in the reference image.

14. The apparatus according to claim 8, wherein, at each selected location, the face detection window having the size that is scaled according to the expected face size is the only face detection window the processor is configured to define.

15. A computer software product, comprising a non-transitory computer-readable medium in which program instructions are stored, which instructions, when read by a computer, cause the computer to receive a depth map, which comprises an array of three-dimensional coordinates, and to receive a two-dimensional image of the scene, to select one or more locations in the two-dimensional image to test for presence of human faces, to define, at each selected location, a respective face detection window having a size that is scaled according to an expected face size, in pixels of the image, at a depth, of the location, that is indicated by the depth map, and to process a part of the two-dimensional image that is contained within each face detection window to determine whether the face detection window contains a human face.

16. The product according to claim 15, wherein the size of the face detection window is set according to an extent, in pixels of the image, of an average face at the depth indicated by the depth map.

17. The product according to claim 15, wherein the instructions cause the computer to normalize the part of the image within each face detection window to a predetermined size, and to apply a face detection algorithm to the normalized part of the image.

18. The product according to claim 17, wherein the face detection algorithm comprises comparing the normalized part of the image within each face detection window to a single template, which is used to test for the presence of human faces at all of the selected locations.

19. The product according to claim 15, wherein the instructions further cause the computer to calibrate the expected face size, using a reference image that is known to contain a face at a known depth.

20. The product according to claim 15, wherein, at each selected location, the face detection window having the size that is scaled according to the expected face size is the only face detection window that the instructions cause the computer to define.

* * * * *